United States Patent
Pasquero et al.

(10) Patent No.: US 9,652,448 B2
(45) Date of Patent: May 16, 2017

(54) METHODS AND SYSTEMS FOR REMOVING OR REPLACING ON-KEYBOARD PREDICTION CANDIDATES

(75) Inventors: Jerome Pasquero, Kitchener (CA); Gil Pinheiro, Waterloo (CA); Donald Somerset McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 71 days.

(21) Appl. No.: 13/548,469

(22) Filed: Jul. 13, 2012

(65) Prior Publication Data
US 2013/0120267 A1 May 16, 2013

Related U.S. Application Data

(63) Continuation-in-part of application No. 13/482,705, filed on May 29, 2012, which is a continuation-in-part
(Continued)

(51) Int. Cl.
*G06F 3/048* (2013.01)
*G06F 17/27* (2006.01)
(Continued)

(52) U.S. Cl.
CPC .......... *G06F 17/276* (2013.01); *G06F 3/0237* (2013.01); *G06F 3/04883* (2013.01); *G06F 3/04886* (2013.01)

(58) Field of Classification Search
CPC .. G06F 3/0237; G06F 17/276; G06F 3/04883; G06F 3/04886
(Continued)

(56) References Cited

U.S. PATENT DOCUMENTS

| 3,872,433 A | 3/1975 | Holmes et al. |
| 4,408,302 A | 10/1983 | Fessel et al. |

(Continued)

FOREIGN PATENT DOCUMENTS

| CA | 2688204 A1 | 7/2010 |
| CA | 2812457 A1 | 10/2013 |

(Continued)

OTHER PUBLICATIONS

"Features Included in the T-Mobile G1", http://www.t-mobileg1.com/T-Mobile-G1-Features.pdf, 2009.
(Continued)

*Primary Examiner* — Andrey Belousov
(74) *Attorney, Agent, or Firm* — Fish & Richardson P.C.

(57) ABSTRACT

Methods and electronic devices are provided for processing prediction candidates in connection with virtual keyboards and touch-sensitive displays. A display area of the touch-sensitive displays a virtual keyboard. Within the virtual keyboard is a plurality of keys, each of at least some of the keys corresponding to one or more different characters of a plurality of characters. The methods and devices may detect a selection of one or more of the keys. The methods and devices may generate one or more sets of characters based on the one or more characters corresponding to the selected key. The methods and devices may display the sets of characters within or substantially within the virtual keyboard. The methods and devices may detect a gesture associated with one of the displayed sets of characters, and, in response to detecting the gesture, remove the one of the displayed sets of characters from the virtual keyboard.

12 Claims, 10 Drawing Sheets

US 9,652,448 B2

Page 2

Related U.S. Application Data of application No. 13/373,356, filed on Nov. 10, 2011, now Pat. No. 8,490,008.

(51) Int. Cl.
  *G06F 3/023* (2006.01)
  *G06F 3/0488* (2013.01)

(58) Field of Classification Search
  USPC .................................................. 715/773, 810
  See application file for complete search history.

(56) References Cited

U.S. PATENT DOCUMENTS

| | | | |
|---|---|---|---|
| 5,261,009 A | 11/1993 | Bokser | |
| 5,664,127 A | 9/1997 | Anderson et al. | |
| 5,832,528 A | 11/1998 | Kwatinetz et al. | |
| 5,959,629 A * | 9/1999 | Masui | G06F 3/0237 345/179 |
| 5,963,671 A * | 10/1999 | Comerford et al. | 382/230 |
| 6,002,390 A | 12/1999 | Masui | |
| 6,064,340 A | 5/2000 | Croft et al. | |
| 6,094,197 A | 7/2000 | Buxton et al. | |
| 6,223,059 B1 | 4/2001 | Haestrup | |
| 6,226,299 B1 | 5/2001 | Henson | |
| 6,351,634 B1 | 2/2002 | Shin | |
| 6,421,453 B1 | 7/2002 | Kanevsky et al. | |
| 6,573,844 B1 | 6/2003 | Venolia et al. | |
| 6,621,424 B1 | 9/2003 | Brand | |
| 6,646,572 B1 | 11/2003 | Brand | |
| 6,801,190 B1 | 10/2004 | Robinson et al. | |
| 7,061,403 B2 | 6/2006 | Fux | |
| 7,098,896 B2 * | 8/2006 | Kushler et al. | 345/168 |
| 7,107,204 B1 | 9/2006 | Liu et al. | |
| 7,216,588 B2 | 5/2007 | Suess | |
| 7,259,752 B1 * | 8/2007 | Simmons | 345/173 |
| 7,277,088 B2 | 10/2007 | Robinson et al. | |
| 7,292,226 B2 | 11/2007 | Matsuura et al. | |
| 7,382,358 B2 | 6/2008 | Kushler et al. | |
| 7,394,346 B2 | 7/2008 | Bodin | |
| 7,443,316 B2 | 10/2008 | Lim | |
| 7,479,949 B2 | 1/2009 | Jobs et al. | |
| 7,487,461 B2 | 2/2009 | Zhai et al. | |
| 7,530,031 B2 | 5/2009 | Iwamura et al. | |
| 7,661,068 B2 | 2/2010 | Lund | |
| 7,671,765 B2 | 3/2010 | Fux | |
| 7,698,127 B2 | 4/2010 | Trower, II et al. | |
| 7,886,233 B2 | 2/2011 | Rainisto et al. | |
| 7,934,156 B2 | 4/2011 | Forstall et al. | |
| 8,023,930 B2 | 9/2011 | Won | |
| 8,059,101 B2 | 11/2011 | Westerman et al. | |
| 8,065,624 B2 | 11/2011 | Morin et al. | |
| 8,201,087 B2 | 6/2012 | Kay et al. | |
| 8,225,203 B2 | 7/2012 | Unruh | |
| 8,289,283 B2 | 10/2012 | Kida et al. | |
| 8,326,358 B2 | 12/2012 | Runstedler et al. | |
| 8,490,008 B2 | 7/2013 | Griffin et al. | |
| 8,516,386 B2 | 8/2013 | Adam et al. | |
| 8,542,206 B2 | 9/2013 | Westerman et al. | |
| 2002/0080186 A1 | 6/2002 | Frederiksen | |
| 2002/0097270 A1 | 7/2002 | Keely et al. | |
| 2002/0154037 A1 | 10/2002 | Houston | |
| 2002/0180797 A1 | 12/2002 | Bachmann | |
| 2004/0111475 A1 | 6/2004 | Schultz | |
| 2004/0135818 A1 | 7/2004 | Thomson et al. | |
| 2004/0140956 A1 | 7/2004 | Kushler et al. | |
| 2004/0153963 A1 | 8/2004 | Simpson et al. | |
| 2004/0201576 A1 | 10/2004 | Shimada et al. | |
| 2005/0017954 A1 | 1/2005 | Kay et al. | |
| 2005/0024341 A1 | 2/2005 | Gillespie et al. | |
| 2005/0039137 A1 | 2/2005 | Bellwood et al. | |
| 2005/0052425 A1 | 3/2005 | Zadesky et al. | |
| 2005/0093826 A1 | 5/2005 | Huh | |
| 2005/0162407 A1 | 7/2005 | Sakurai et al. | |
| 2005/0195173 A1 | 9/2005 | McKay | |
| 2005/0244208 A1 | 11/2005 | Suess | |
| 2005/0275632 A1 | 12/2005 | Pu et al. | |
| 2006/0022947 A1 | 2/2006 | Griffin et al. | |
| 2006/0026521 A1 | 2/2006 | Hotelling et al. | |
| 2006/0033724 A1 | 2/2006 | Chaudhri et al. | |
| 2006/0053387 A1 | 3/2006 | Ording | |
| 2006/0176283 A1 | 8/2006 | Suraqui | |
| 2006/0209040 A1 | 9/2006 | Garside et al. | |
| 2006/0239562 A1 | 10/2006 | Bhattacharyay et al. | |
| 2006/0253793 A1 | 11/2006 | Zhai et al. | |
| 2006/0265648 A1 | 11/2006 | Rainisto et al. | |
| 2006/0265668 A1 | 11/2006 | Rainisto | |
| 2006/0279548 A1 | 12/2006 | Geaghan | |
| 2007/0046641 A1 | 3/2007 | Lim | |
| 2007/0061753 A1 | 3/2007 | Ng et al. | |
| 2007/0150842 A1 | 6/2007 | Chaudhri et al. | |
| 2007/0156394 A1 | 7/2007 | Banerjee et al. | |
| 2007/0157085 A1 | 7/2007 | Peters | |
| 2007/0229476 A1 | 10/2007 | Huh | |
| 2007/0256029 A1 | 11/2007 | Maxwell | |
| 2007/0263932 A1 | 11/2007 | Bernardin et al. | |
| 2008/0033713 A1 | 2/2008 | Brostrom | |
| 2008/0100581 A1 | 5/2008 | Fux | |
| 2008/0122796 A1 | 5/2008 | Jobs et al. | |
| 2008/0126387 A1 | 5/2008 | Blinnikka | |
| 2008/0136587 A1 | 6/2008 | Orr | |
| 2008/0141125 A1 | 6/2008 | Ghassabian | |
| 2008/0158020 A1 | 7/2008 | Griffin | |
| 2008/0168366 A1 | 7/2008 | Kocienda et al. | |
| 2008/0184360 A1 | 7/2008 | Kornilovsky et al. | |
| 2008/0189605 A1 | 8/2008 | Kay et al. | |
| 2008/0195388 A1 | 8/2008 | Bower et al. | |
| 2008/0231610 A1 | 9/2008 | Hotelling et al. | |
| 2008/0259040 A1 | 10/2008 | Ording et al. | |
| 2008/0266261 A1 | 10/2008 | Idzik | |
| 2008/0273013 A1 | 11/2008 | Levine et al. | |
| 2008/0281583 A1 | 11/2008 | Slothouber et al. | |
| 2008/0304890 A1 | 12/2008 | Shin et al. | |
| 2008/0309644 A1 | 12/2008 | Arimoto | |
| 2008/0316183 A1 | 12/2008 | Westerman et al. | |
| 2008/0318635 A1 | 12/2008 | Yoon et al. | |
| 2009/0002326 A1 | 1/2009 | Pihlaja | |
| 2009/0006991 A1 | 1/2009 | Lindberg et al. | |
| 2009/0025089 A1 | 1/2009 | Martin et al. | |
| 2009/0058823 A1 | 3/2009 | Kocienda | |
| 2009/0058830 A1 | 3/2009 | Herz et al. | |
| 2009/0066668 A1 | 3/2009 | Kim et al. | |
| 2009/0077464 A1 | 3/2009 | Goldsmith et al. | |
| 2009/0085881 A1 | 4/2009 | Keam | |
| 2009/0094562 A1 | 4/2009 | Jeong et al. | |
| 2009/0125848 A1 | 5/2009 | Keohane et al. | |
| 2009/0132576 A1 | 5/2009 | Miller et al. | |
| 2009/0144667 A1 | 6/2009 | Christoffersson et al. | |
| 2009/0150785 A1 | 6/2009 | Asami et al. | |
| 2009/0160800 A1 | 6/2009 | Liu et al. | |
| 2009/0167700 A1 | 7/2009 | Westerman et al. | |
| 2009/0174667 A1 | 7/2009 | Kocienda et al. | |
| 2009/0193334 A1 | 7/2009 | Assadollahi | |
| 2009/0213081 A1 | 8/2009 | Case, Jr. | |
| 2009/0228792 A1 | 9/2009 | Van Os et al. | |
| 2009/0228842 A1 | 9/2009 | Westerman et al. | |
| 2009/0237361 A1 | 9/2009 | Mosby et al. | |
| 2009/0247112 A1 | 10/2009 | Lundy et al. | |
| 2009/0251410 A1 | 10/2009 | Mori et al. | |
| 2009/0254818 A1 | 10/2009 | Jania et al. | |
| 2009/0259962 A1 | 10/2009 | Beale | |
| 2009/0265669 A1 | 10/2009 | Kida et al. | |
| 2009/0267909 A1 | 10/2009 | Chen et al. | |
| 2009/0284471 A1 | 11/2009 | Longe et al. | |
| 2009/0295737 A1 | 12/2009 | Goldsmith et al. | |
| 2009/0307768 A1 | 12/2009 | Zhang et al. | |
| 2009/0313693 A1 | 12/2009 | Rogers | |
| 2010/0020033 A1 | 1/2010 | Nwosu | |
| 2010/0020036 A1 | 1/2010 | Hui et al. | |
| 2010/0026650 A1 | 2/2010 | Srivastava et al. | |
| 2010/0045705 A1 | 2/2010 | Vertegaal et al. | |
| 2010/0050121 A1 | 2/2010 | Shin | |
| 2010/0052880 A1 | 3/2010 | Laitinen | |
| 2010/0070908 A1 | 3/2010 | Mori et al. | |

(56) References Cited

U.S. PATENT DOCUMENTS

| | | |
|---|---|---|
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0063356 A1 | 3/2013 | Martisauskas |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285916 A1 | 10/2013 | Griffin et al. |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |

FOREIGN PATENT DOCUMENTS

| | | |
|---|---|---|
| CA | 2813393 A1 | 10/2013 |
| CA | 2819893 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |

(56) References Cited

FOREIGN PATENT DOCUMENTS

| | | |
|---|---|---|
| EP | 2653955 A1 | 10/2013 |
| EP | 2660696 A1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-68963 A | 4/2012 |
| KP | 20120030652 A | 3/2012 |
| WO | 03/029950 A2 | 4/2003 |
| WO | 03/054681 A1 | 7/2003 |
| WO | 04/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | 2008/030974 A1 | 3/2008 |
| WO | WO2008/057785 A2 | 5/2008 |
| WO | 2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010/035574 A1 | 4/2010 |
| WO | WO2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. in a PDF or any other text format on a touch based mobile/tablet device, IP.com Journal, Mar. 1, 2011, XP013142665, (10 pages).
Droid X by Motorola © 2010 Screen shots.
Droid X by Motorola © 2010 User Manual (72 pages).
European Search Report dated Feb. 28, 2011, issued in European Patent Application No. 10160590.5.
Extended European Search Report dated Aug. 24, 2012, issued in European Application No. 12166115.1 (5 pages).
Extended European Search Report dated Aug. 31, 2012, issued in European Application No. 12166170.6 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/EP2012/057944, on Oct. 12, 2012, (10 pages).
International Search Report and Written Opinion issued in International Application No. PCT/IB2011/003273, on Jun. 14, 2012, (8 pages).
International Search Report and Written Opinion mailed Sep. 10, 2012, issued for International Application No. PCT/EP2012/057945 (11 pages).
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No. 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
U.S. Office Action for U.S. Appl. No. 12/764,298, dated Jul. 20, 2012, (38 pages).
U.S. Office Action for U.S. Appl. No. 13/482,705, dated Aug. 7, 2012, (10 pages).
User Guide Samsung Moment(TM) with Google(TM), dated Dec. 4, 2009 (122 pages).
User Guide Samsung Moment(TM) with Google(TM), dated Mar. 2, 2010 (218 pages).

(56) References Cited

OTHER PUBLICATIONS

Office Action, dated Sep. 25, 2012, in European Application No. 12176453.4-1527 (7 pages).
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
Canadian Office Action dated Mar. 27, 2013, issued in Canadian Application No. 2,737,314 (3 pages).
European Examination Report dated Apr. 5, 2013, issued in European Application No. 12180190.6 (7 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated May 30, 2013, issued in U.S. Appl. No. 13/572,232 (49 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).
Swype Product Features, accessed online at http://www.swype.com/about/specifications/ on Feb. 25, 2013 (2 pages).
Through the Magic Window—Magic Window word processor for the Apple II, Artsci Publishing, 1980, http://www.artscipub.com/history/magicwindow, accessed May 21, 2013 (5 pages).
U.S. Appl. No. 13/601,736, filed Aug. 31, 2012 (44 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Canadian Office Action dated Aug. 8, 2012, issued in Canadian Application No. 2,688,204 (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, "http://www.wireless.att.com/support_static_files/Kb/KB72601.html", at least as early as Feb. 8, 2008 (3 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
Extended European Search Report dated Dec. 21, 2012, issued in European Application No. 12173818.1, (8 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Dec. 13, 2013, issued in U.S. Appl. No. 13/572,232, (30 pages).
Final Office Action dated Feb. 10, 2014, issued in U.S. Appl. No. 13/485,723, (19 pages).
Final Office Action dated Jul. 25, 2013, issued in U.S. Appl. No. 13/560,796, (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (20 pages).
Office Action dated Dec. 6, 2013, issued in U.S. Appl. No. 13/564,697, (22 pages).

(56) References Cited

OTHER PUBLICATIONS

Office Action dated Jan. 31, 2014, issued in U.S. Appl. No. 13/534,101, (38 pages).
Office Action dated Jun. 8, 2011, issued in U.S. Appl. No. 12/362,536 (19 pages).
Office Action dated Mar. 12, 2014, issued in U.S. Appl. No. 13/616,423, (21 pages).
Office Action dated Nov. 22, 2013, issued in U.S. Appl. No. 13/447,704, (47 pages).
Office Action dated Oct. 17, 2013, issued in U.S. Appl. No. 13/485,723, (28 pages).
Touchpal (combination of two sources: first, youtube video on touchpal at url: http://www.youtube.com/watch?v=eJUWFEXxJaI, dated on Dec. 1, 2011, with screen captures shown below; second, TimesofIndia website article on touchpal at url: http://articles.timesofIndia.indiatimes.com/2012-01-29/computing/30673975_1_swype-android-market-qwerty).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,864, filed Aug. 31, 2012, (23 pages).
U.S. Appl. No. 13/601,898, filed Aug. 31, 2012, (28 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 2, 2014, issued in Canadian Application No. 2,812,033, (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Final Office Action dated Apr. 11, 2014, issued in U.S. Appl. No. 13/447,704, (18 pages).
Final Office Action dated Mar. 26, 2014, issued in U.S. Appl. No. 13/564,697, (9 pages).
Office Action dated Apr. 11, 2014, issued in U.S. Appl. No. 13/481,171, (29 pages).
Office Action dated Apr. 11, 2014, issued in U.S. Appl. No. 13/572,232, (38 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Jun. 11, 2014, issued in U.S. Appl. No. 13/563,182, (12 pages).
Office Action dated Jun. 18, 2014, issued in U.S. Appl. No. 13/601,898, (27 pages).
Office Action dated Mar. 14, 2014, issued in U.S. Appl. No. 13/569,000, (25 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).
Canadian Office Action in Canadian Application No. 2,820,997, dated Feb. 18, 2015, 6 pages.

\* cited by examiner

METHODS AND SYSTEMS FOR REMOVING OR REPLACING ON-KEYBOARD PREDICTION CANDIDATES

RELATED APPLICATION DATA

This application is a continuation-in-part of co-pending U.S. application Ser. No. 13/482,705, filed May 29, 2012, which is a continuation-in-part of co-pending U.S. application Ser. No. 13/373,356, filed Nov. 10, 2011, the subject matter of each of which is hereby incorporated by reference in its entirety.

FIELD

Example embodiments relate to processing prediction candidates in connection with virtual keyboards and touch-sensitive displays.

BACKGROUND

Increasingly, electronic devices, such as computers, netbooks, cellular phones, smart phones, personal digital assistants, and tablets, etc., have touch-sensitive displays that allow a user to input characters into an application, such as a word processor or email application. Character input on touch-sensitive displays can be a cumbersome task due to, for example, a small touch-sensitive display area, particularly where a user needs to input a long message. For example, for text entry the touch-sensitive display is typically divided into two areas, a first portion for displaying an interactive virtual keyboard having a set of selectable keys and a second portion for displaying selected input associated with the keys.

Predictive text input solutions have been introduced for assisting with input on an electronic device. These solutions include predicting a word a user is entering after, for example, the user inputs one or more characters of the word, and offering to the user one or more suggestions for one or more additional characters to complete the word input. Similarly, some word prediction solutions offer users full word predictions based, for example, on the context of other words previously input by the user alone or with the assistance of a word prediction solution.

BRIEF DESCRIPTION OF THE DRAWINGS

Reference will now be made to the accompanying drawings showing example embodiments of this disclosure. In the drawings.

DETAILED DESCRIPTION

Figure 1:
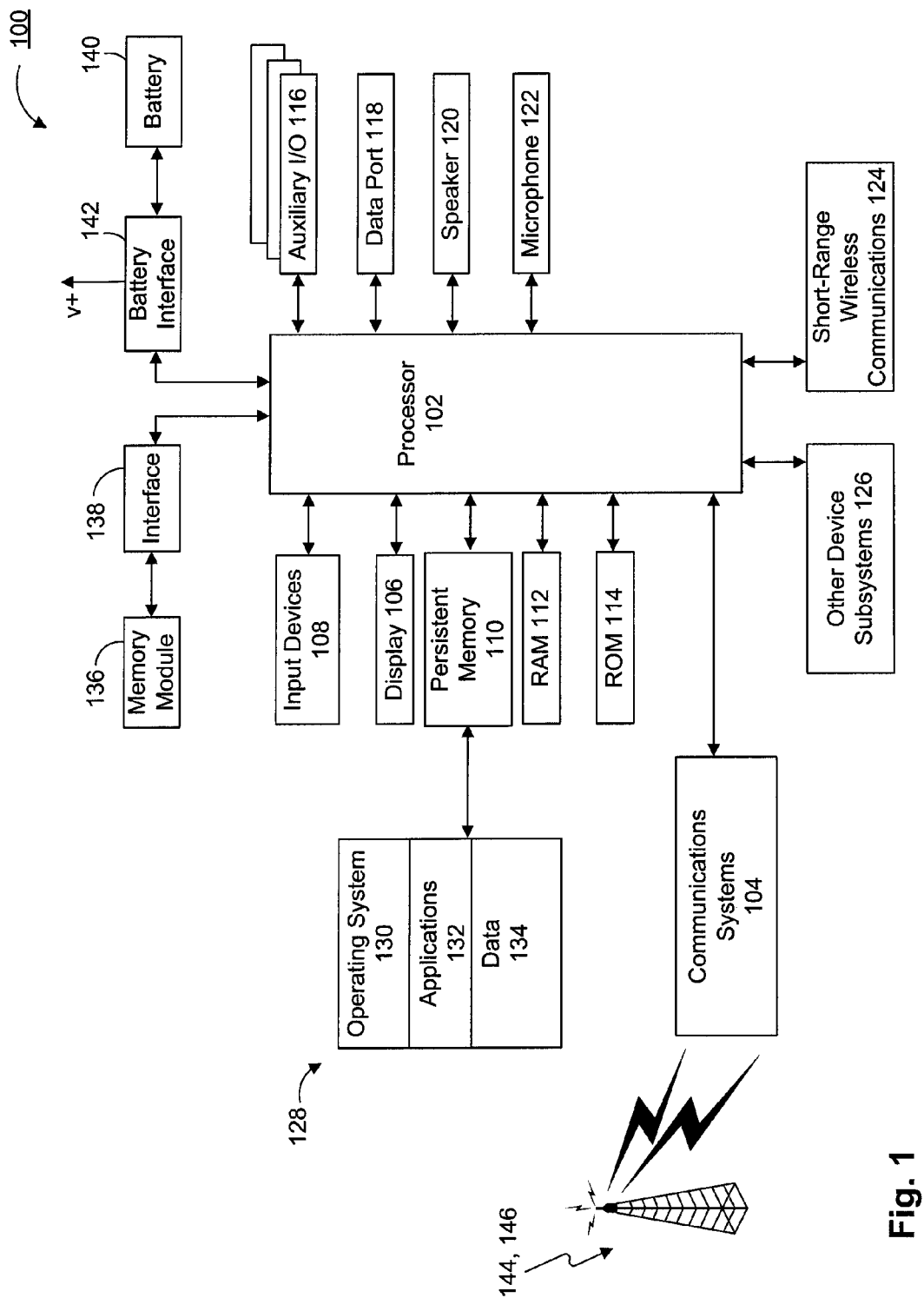
FIG. 1 is a simplified block diagram illustrating an example mobile communication device in accordance with an example embodiment.

In electronic devices with touch-sensitive displays that allow a user to input characters into an application where the touch-sensitive display is divided, for example, into two areas, a first portion for displaying an interactive virtual keyboard having a set of selectable keys and a second portion for displaying selected input associated with the keys, the user often has to divert focus from the virtual keyboard to view input reflected by selected keys in the second portion or to consider suggested character(s) of a predictive text process displayed in the second portion, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

In one disclosed embodiment, a method for an electronic device having a touch-sensitive display and processor is disclosed. The method comprises displaying in a display area of the touch-sensitive display a virtual keyboard. In addition, the method comprises displaying within the virtual keyboard a plurality of keys, each of at least some of the keys corresponding to one or more different characters of a plurality of characters. The method also comprises detecting a selection of one or more of the keys. In addition, the method comprises generating a set of characters based on the one or more characters corresponding to the selected keys. The method also comprises displaying the set of characters within or substantially within the virtual keyboard. In addition, the method comprises detecting a gesture associated with the displayed set of characters, and, in response to detecting the gesture, removing the displayed set of characters from the virtual keyboard.

In another disclosed embodiment, an electronic device is provided. The electronic device includes a touch-sensitive display, one or more processors, one or more memories, and instructions stored on the one or more memories. The instructions, when executed by the one or more processors, cause the electronic device to perform the steps of: displaying in a display area of the touch-sensitive display a virtual keyboard, displaying within the virtual keyboard a plurality of keys, each of at least some of the keys corresponding to one or more different characters of a plurality of characters, detecting a selection of one or more of the keys, generating a set of characters based on the one or more characters corresponding to the selected keys, displaying the set of characters within or substantially within the virtual keyboard, detecting a gesture associated with the displayed set of characters, and removing the displayed set of characters from the virtual keyboard in response to detecting the gesture.

In another disclosed embodiment, an electronic device is provided. The electronic device includes a touch-sensitive display and a processor. The processor is configured to display in a display area of the touch-sensitive screen a virtual keyboard, display within the virtual keyboard a plurality of keys, display within the display area a viewing pane configured to hold a predetermined amount of text, detect selection of one or more of the keys forming a prefix text portion, the prefix text portion comprising one or more characters, display the prefix text portion in the viewing pane, determine one or more potential completion text portions as a function of the prefix text portion, display the one or more potential completion text portions proximate to selected keys of the virtual keyboard, each selected key being selected based on a first character in each of the one or more displayed potential completion text portions, detect a gesture associated with one of the potential completion text portions, and responsive at least in part to the detected gesture, alter display of the one of the potential completion text portion associated with the gesture.

In another disclosed embodiment, an electronic device is provided. The electronic device includes a touch-sensitive display, a linguistic database, and a processor. The processor is configured to display in a display area of the touch-sensitive screen a virtual keyboard, display within the virtual keyboard a plurality of keys, display within the display area a viewing pane configured to hold a predetermined amount of text, detect selection of one or more of the keys forming a first text portion, the first text portion comprising one or more characters, display the first text portion in the viewing pane, determine one or more potential second text portions as a function of the first text portion, the one or more potential second text portions having the first text portion as a prefix and being selected from the linguistic database, display the one or more potential second text portions proximate to selected keys of the virtual keyboard, each selected key being selected based on a first character in each of the one or more displayed potential second text portions, detect a gesture associated with one of the potential second text portions, and responsive at least in part to the detected gesture, alter display of the one of the potential second text portion associated with the gesture.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are example and explanatory only and are not limiting. Instead, the proper scope is defined by the appended claims.

In addition, numerous specific details are set forth in order to provide a thorough understanding of the example embodiments described herein. However, it will be understood by those of ordinary skill in the art that the example embodiments described herein can be practiced without these specific details. Furthermore, well-known methods, procedures and components have not been described in detail so as not to obscure the example embodiments described herein.

Various embodiments for removing or replacing on-keyboard prediction candidates are disclosed. Example embodiments described herein may receive character inputs, generate sets of predicted characters based on the received character inputs, and display the sets of predicted characters at or near keys that correspond to characters in the sets of predicted characters. Example embodiments described herein further enable a user to remove or replace predicted characters that are displayed at or near keys.

Reference is now made to FIG. 1, which illustrates in detail example communication device 100 in which example embodiments can be applied. Communication device 100 is a two-way communication device having data and voice communication capabilities, and the capability to communicate with other computer systems, for example, via the Internet. Depending on the functionality provided by communication device 100, in various embodiments communication device 100 can be a handheld device, a multiple-mode communication device configured for both data and voice communication, a smartphone, a mobile telephone, a netbook, a gaming console, a tablet, or a PDA (personal digital assistant) enabled for wireless communication.

Communication device 100 includes a case (not shown) housing the components of communication device 100. In some embodiments device 100 has a rectangular shape with two planar sides, although other configurations may be adopted. The internal components of communication device 100 can, for example, be constructed on a printed circuit board (PCB). The description of communication device 100 herein mentions a number of specific components and subsystems. Although these components and subsystems can be realized as discrete elements, the functions of the components and subsystems can also be realized by integrating, combining, or packaging one or more elements in any suitable fashion.

Communication device 100 includes a controller comprising at least one processor 102 (such as a microprocessor), which controls the operation of communication device 100. Processor 102 can be a single microprocessor, multiple microprocessors, field programmable gate arrays (FPGAs), digital signal processors (DSPs) capable of executing particular sets of instructions, or any circuit capable of electrically coupling the device subsystems. Processor 102 interacts with device subsystems such as a communication system 104 for exchanging radio frequency signals with a wireless network (for example WAN 144 and/or PLMN 146) to perform communication functions.

Processor 102 also interacts with additional device subsystems including a display 106 such as a liquid crystal display (LCD) screen or any other appropriate display, input devices 108 such as a keyboard and control buttons, persistent memory 110, random access memory (RAM) 112, read only memory (ROM) 114, auxiliary input/output (I/O) subsystems 116, data port 118 such as a conventional serial data port or a Universal Serial Bus (USB) data port, speaker 120, microphone 122, short-range wireless communications subsystem 124 (which can employ any appropriate wireless (for example, RF), optical, or other short range communications technology), and other device subsystems generally designated as 126. Some of the subsystems shown in FIG. 1 perform communication-related functions, whereas other subsystems can provide "resident" or on-device functions.

On one planar side of device 100 is the display 106 that can be realized as a touch-sensitive display in some embodiments. The touch-sensitive display can be constructed using a touch-sensitive input surface coupled to an electronic controller and which overlays the visible element of display 106. The touch-sensitive overlay and the electronic controller provide a touch-sensitive input device and processor 102 interacts with the touch-sensitive overlay via the electronic controller. In some embodiments the touch-sensitive overlay may extend beyond a display area of display 106 to the edges of the side of communication device 100.

Communication system 104 includes one or more communication systems for communicating with wireless WAN 144 and wireless access points within the wireless network.

The particular design of communication system 104 depends on the wireless network in which communication device 100 is intended to operate. Communication device 100 can send and receive communication signals over the wireless network after the required network registration or activation procedures have been completed.

Processor 102 operates under stored program control and executes software modules 128 stored in a tangible non-transitory computer-readable storage medium such as persistent memory 110, which can be a flexible disk, a hard disk, a CD-ROM (compact disk-read only memory), a MO (magneto-optical) disk, a DVD-ROM (digital versatile disk-read only memory), a DVD RAM (digital versatile disk-random access memory), or a semiconductor memory. Software modules 128 can also be stored in a computer-readable storage medium such as ROM 114, or any appropriate persistent memory technology, including EEPROM, EAROM, and FLASH. These computer-readable storage mediums store computer-readable instructions for execution by processor 102 to perform a variety of functions on communication device 100.

Software modules 128 can include operating system software 130, used to control operation of communication device 100. Additionally, software modules 128 can include software applications 132 for providing additional functionality to communication device 100. Software applications 132 can further include a range of applications, including, for example, e-mail messaging application, address book, spell check application, text prediction application, notepad application, Internet browser application, voice communication (i.e., telephony) application, mapping application, or a media player application, or any combination thereof. Each of software applications 132 can include layout information defining the placement of particular fields and graphic elements (for example, text fields, input fields, icons, etc.) in the user interface (i.e., display 106) according to the application.

In some embodiments, persistent memory 110 stores data 134, including linguistic data stored in a database structure. The linguistic data is used, for example, by one or more of the applications, such as the spell check application and the text prediction application. The linguistic data may include default linguistic data, such as words and/or groups of words, with a corresponding number for each word or group of words indicating the number of words in the word or group of words. The linguistic data may also include custom linguistic data, such as words or groups of words previously entered by the user. The linguistic data may also include data acquired from a device other than communication device 100. In certain embodiments, data 134 also includes service data comprising information required by communication device 100 to establish and maintain communication with the wireless network (for example WAN 144 and/or PLMN 146.

In some embodiments, auxiliary input/output (I/O) subsystems 116 comprise an external communication link or interface, for example, an Ethernet connection. In some embodiments, device 100 includes one or more sensors such as an accelerometer, GPS, temperature sensor, and pressure sensor. In some embodiments, auxiliary I/O subsystems 116 can further comprise one or more input devices, including a pointing or navigational tool such as an optical trackpad, clickable trackball, scroll wheel or thumbwheel, or one or more output devices, including a mechanical transducer such as a vibrator for providing vibratory notifications in response to various events on communication device 100 (for example, receipt of an electronic message or incoming phone call), or for other purposes such as haptic feedback (touch feedback).

In some embodiments, communication device 100 also includes one or more removable memory modules 136 (typically comprising FLASH memory) and a memory module interface 138. Among possible functions of removable memory module 136 is to store information used to identify or authenticate a subscriber or the subscriber's account to a wireless network (for example WAN 144 or PLMN 146). For example, in conjunction with certain types of wireless networks, such as GSM and successor networks, removable memory module 136 is referred to as a Subscriber Identity Module (SIM). Memory module 136 is inserted in or coupled to memory module interface 138 of communication device 100 in order to operate in conjunction with the wireless network.

Communication device 100 also includes a battery 140 which furnishes energy for operating communication device 100. Battery 140 can be coupled to the electrical circuitry of communication device 100 through a battery interface 142, which can manage such functions as charging battery 140 from an external power source (not shown) and the distribution of energy to various loads within or coupled to communication device 100. Short-range wireless communications subsystem 124 is an additional optional component that provides for communication between communication device 100 and different systems or devices, which need not necessarily be similar devices. For example, short-range wireless communications subsystem 124 can include an infrared device and associated circuits and components, or a wireless bus protocol compliant communication device such as a BLUETOOTH® communication module to provide for communication with similarly-enabled systems and devices.

A predetermined set of applications that control basic device operations, including data and possibly voice communication applications can be installed on communication device 100 during or after manufacture. Additional applications or upgrades to operating system software 130 or software applications 132 can also be loaded onto communication device 100 through the wireless network (for example WAN 144 and/or PLMN 146), auxiliary I/O subsystem 116, data port 118, short-range wireless communication subsystem 124, or other suitable subsystems 126. The downloaded programs or code modules can be permanently installed, for example, written into the persistent memory 110, or written into and executed from RAM 112 for execution by processor 102 at runtime.

Communication device 100 provides, for example, three modes of communication: a data communication mode, a voice communication mode, and a video communication mode. In the data communication mode, a received data signal such as a text message, an e-mail message, Web page download, or an image file are processed by communication system 104 and input to processor 102 for further processing. For example, a downloaded Web page can be further processed by a browser application, or an e-mail message can be processed by an e-mail message messaging application and output to display 106. A user of communication device 100 can also compose data items, such as e-mail messages, for example, using the input devices, such as auxiliary I/O subsystem 116, in conjunction with display 106. These composed items can be transmitted through communication system 104 over the wireless network (for example WAN 144 or PLMN 146). In the voice communication mode, communication device 100 provides telephony functions and operates as a typical cellular phone. In the video communication mode, communication device 100 provides video telephony functions and operates as a video teleconference terminal. In the video communication mode, communication device 100 utilizes one or more cameras (not shown) to capture video of video teleconference.

Figure 2:
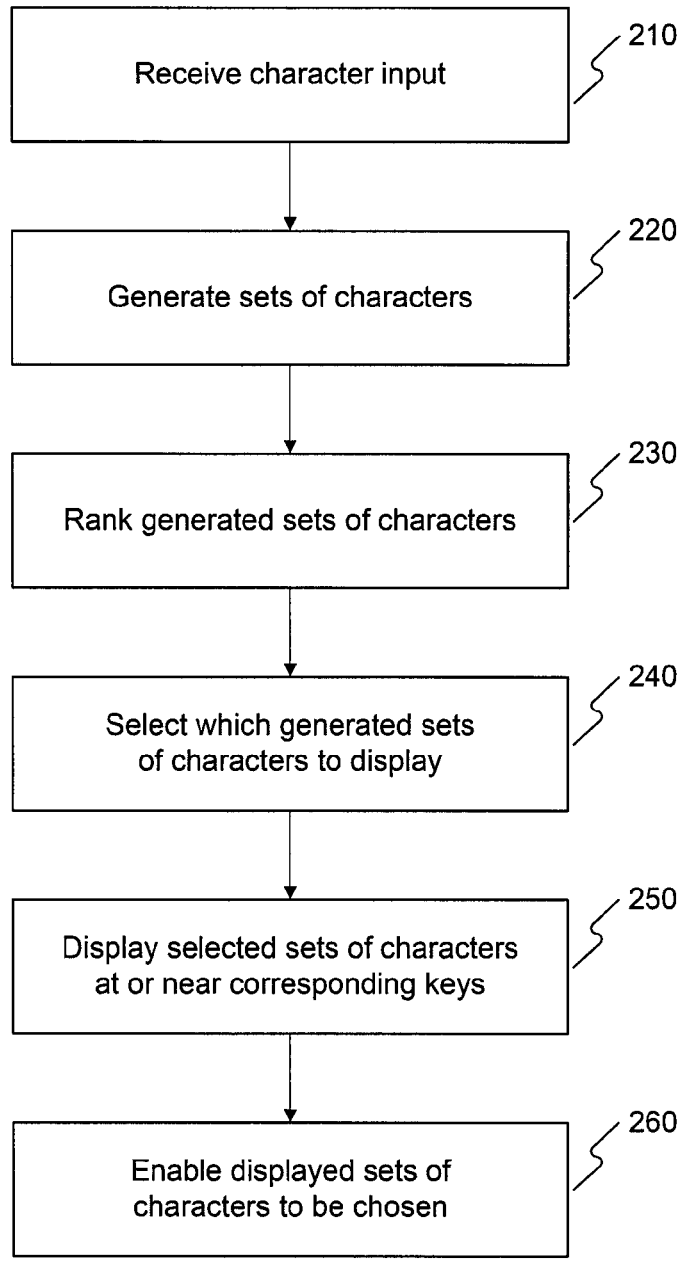
FIG. 2 is a flowchart illustrating an example method for predicting and displaying selected sets of characters.

Reference is now made to FIG. 2, which depicts a flow diagram of an example method 200 for predicting and displaying sets of characters. Method 200 begins by receiving an input of one or more characters (step 210). For example, processor 102 of device 100 may receive characters from a virtual keyboard displayed on a touch-sensitive display. The virtual keyboard has one or more rows of selectable keys, where each key is assigned a location in a row, each key is assigned a character, and each character is displayed on the assigned key. For example, the virtual keyboard is configured in accordance with the QWERTY keyboard layout. Key selection on the virtual keyboard causes character input. The inputted characters may be displayed in an input field that displays characters input using the virtual keyboard. As used herein, a character can be any alphanumeric character set in device 100, such as, for example, a letter, a number, a symbol, a space, or a punctuation mark.

According to method 200 the processor 102 generates one or more sets of characters, such as for example, words, phrases, acronyms, names, slang, colloquialisms, abbreviations, or any combination thereof based on the input received in step 210 (step 220). The sets of characters may include, for example, sets of characters that are stored in a dictionary in a memory of the electronic device, sets of characters that were previously inputted by a user, sets of characters based on a hierarchy or tree structure, or any other sets of characters that are selected by a processor based on a predefined arrangement. For example, using a text prediction application the processor may access data 134, including the stored linguistic data, to identify the one or more sets of characters in step 220.

In some example embodiments, the processor 102 uses contextual data for generating sets of characters. Contextual data considers the context of characters in the input field. Contextual data may include information about, for example, a set of characters previously inputted by a user, grammatical attributes of the characters inputted in the input field (e.g., whether a noun or a verb is needed as the next set of characters in a sentence), or any combination thereof. For example, if the set of characters "the" has already been inputted into the input field, the processor may use the contextual data to determine that a noun—instead of a verb—will most likely be the next set of characters after "the." Likewise, if the set of characters "Guy Lafleur played in the National Hockey" was inputted, based on the context, the processor may determine the subsequent set of characters is likely "League." Using the contextual data, the processor may also determine whether an inputted character was incorrect. For example, the processor may determine that an inputted character was supposed to be a "w" instead of an "a", given the proximity of these characters on a QWERTY virtual keyboard.

Processor 102 may, in some example embodiments, include an affix as a generated set of characters, such as, for example, an adverb ending, an adjective ending, different verb tenses, a plural ending or a plural form. Any known predictive technique or software can be used to process the received input and the contextual data in generating the sets of characters at step 220.

In some example embodiments, the sets of characters generated at step 220 can begin with the same character received as input at step 210. For example, if the characters "pl" have been received as input using a virtual keyboard, these characters will be received by the processor as the character input. In such embodiments, the sets of characters generated at step 220 would all begin with "pl", such as "please" or "plot." Similarly, if the user has input the characters "child", the affixes generated at step 220 could include, for example, "-ren", to make the set of characters "children", or "-ish", to make the set of characters "childish."

In some example embodiments, the sets of characters generated at step 220 may include the characters received as input at step 210 in any position. For example, if the received input is an "x", the processor may generate "example", "xylophone", or "fax" as sets of characters.

In addition, in some example embodiments, the sets of characters generated at step 220 may include characters assigned to the same key as the input characters. For example, if a given key can be used to input either "a" or "b", and the received input is an "a", the processor may generate "banana" or "apple" as sets of characters.

In addition, in some example embodiments, the input characters are representative of a prefix and the sets of characters are representative of a completion text portion. For example, if the input characters (i.e., the prefix) are "appl", the sets of characters (i.e., the completion text portions) can be "e", "ication", "ying", representative of the linguistic objects "apple", "application", and "applying". In some embodiments, the completion text portions are found by searching the linguistic data source for the prefix combined with possible completion text portions.

Returning to the example method 200, the processor 102 ranks the generated sets of characters (step 230). The ranking may reflect, for example, the likelihood that a candidate set of characters is intended by a user or the likelihood that a candidate set of characters will be chosen by a user compared to another candidate set of characters. In some embodiments, the ranking may be based on contextual data. For example, in some embodiments, the electronic device may be configured to rank nouns or adjectives higher based on the received characters. If the received characters are suggestive of a noun or adjective, the processor, using the contextual data, may rank the nouns or adjectives corresponding to what the user is typing higher than other parts of speech. In some embodiments, sets of characters including adjective affixes (such as "-ish" or "-ful"), phrases, plurals, or combinations thereof may also be ranked. In some embodiments, contextual data may include information about which programs or applications are currently running or being used on the electronic device. For example, if the device is running an email application, then sets of characters associated with that device's email application, such as sets of characters from the device's contact list, can be used to determine the ranking. N-grams, such as unigrams, bigrams, and trigrams, may be also used in the ranking of the sets of characters. The geolocation of the electronic device may also be used in the ranking process. If, for example, the electronic device recognizes that it is located at a user's office, then sets of characters generally associated with work may be ranked higher in the list. If, on the other hand, the device determines that the device is located at a beach, then sets of characters generally associated with the beach may be ranked higher in the list.

The processor 102 selects which of the sets of characters to display based on the ranking (step 240). For example, in some embodiments, higher ranked sets of characters are more likely to be selected than lower ranked sets of characters. In addition, in some embodiments, as described in further detail below, subsequent candidate input characters of the sets of characters affects how processor 102 selects which of the sets of characters to display, in accordance with the method 200.

In some embodiments, the processor 102 displays one or more of the selected sets of characters at a location within or substantially within the keyboard corresponding to a subsequent candidate input character, predicted as the next character in a word that a user might input (step 250). For example, if a user inputs "pl", the word "please" is displayed on the key for the letter "e"—the subsequent candidate input character for that word. Similarly, the word "plus" is displayed on the key for the letter "u"—the subsequent candidate input character of the word "plus" if "pl" has already been entered. In some embodiments, a subsequent candidate input character is any alphanumeric character, such as, for example, a letter, number, symbol, or punctuation mark. If a delimiter (e.g., a <SPACE>) has been used, the selected sets of characters are placed on subsequent candidate input characters that correspond to the first letter of the selected sets of characters on a key corresponding to the delimiter.

In some embodiments, the selected sets of characters are displayed at or near keys on the virtual keyboard associated with the subsequent candidate input characters. In some embodiments, whether a set of characters is displayed at or near a key depends, for example, on the size of a candidate set of characters or the number and size of nearby candidate sets of characters. In some embodiments, gaps are provided between rows of keys, wherein a given candidate set of characters may be displayed in a gap near a key corresponding to a subsequent candidate input character.

In some embodiments, the selected sets of characters are displayed substantially within the virtual keyboard. That is, some of the pixels of a displayed set of characters may be displayed within the virtual keyboard, and some of the pixels of the displayed set of characters may be displayed in another region, such as, for example, the text input field. For example, if a key corresponding to a subsequent candidate input character of a set of characters is in a top row of the virtual keyboard, a lower displayed portion of the set of characters may be displayed within the virtual keyboard on or near the key, and an upper displayed portion of the set of characters may be displayed in the input field.

Processor 102, in some embodiments, causes display of the one or more selected sets of characters in a manner that will attract the user's attention. In some embodiments, the appearance of a displayed set of characters is enhanced or changed in a way that makes the set more readily visible to a user. For example, displayed sets of characters is displayed with backlighting, highlighting, underlining, bolding, italicizing, using combinations thereof, or in any other way for making the displayed sets of characters more visible.

When identifying the sets of characters for display at step 240, in some embodiments the processor 102 limits the displayed sets of characters to the top few or chooses among the higher ranked sets of characters. For example, if two sets of characters are both ranked high, and these sets of characters would otherwise be displayed at the same key, the electronic device could be configured to display only the highest ranked selected set of characters. In other embodiments, both sets of characters are displayed at or around the same key, or one set of characters is displayed at one key while the second set of characters is displayed at another key. In some example embodiments, the processor takes into account the display size to limit the number of selected sets of characters.

In some embodiments, the ranking is used to choose between two or more sets of characters that, when displayed on adjacent keys, would overlap with each other (e.g., because of their respective lengths). In such embodiments, the electronic device is configured to display the higher ranked set of characters on the keyboard. For example, if the set of characters "establishment" is ranked first in a list generated at step 240 after the letter "E" is inputted, "establishment" could be displayed at the "S" key. When displayed on a virtual keyboard, however, its length might occupy some space on the "A" key and the "D" key, potentially blocking a set of characters that would be displayed on or around those keys. Thus, at step 240, it is determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the sets of characters, effectively permitting a long set of characters to be displayed within or mostly within the boundaries of a single key simultaneously with other sets of characters on adjacent keys of a virtual keyboard.

According to method 200, processor 102 enables displayed sets of characters to be chosen for input into the input field (step 260). In some embodiments, a given set of characters from the displayed sets of characters is chosen for entry into the input field if a predetermined gesture is detected. For example, a swipe-right gesture may cause a given set of characters closest to the gesture to be entered into the input field.

Figure 7:
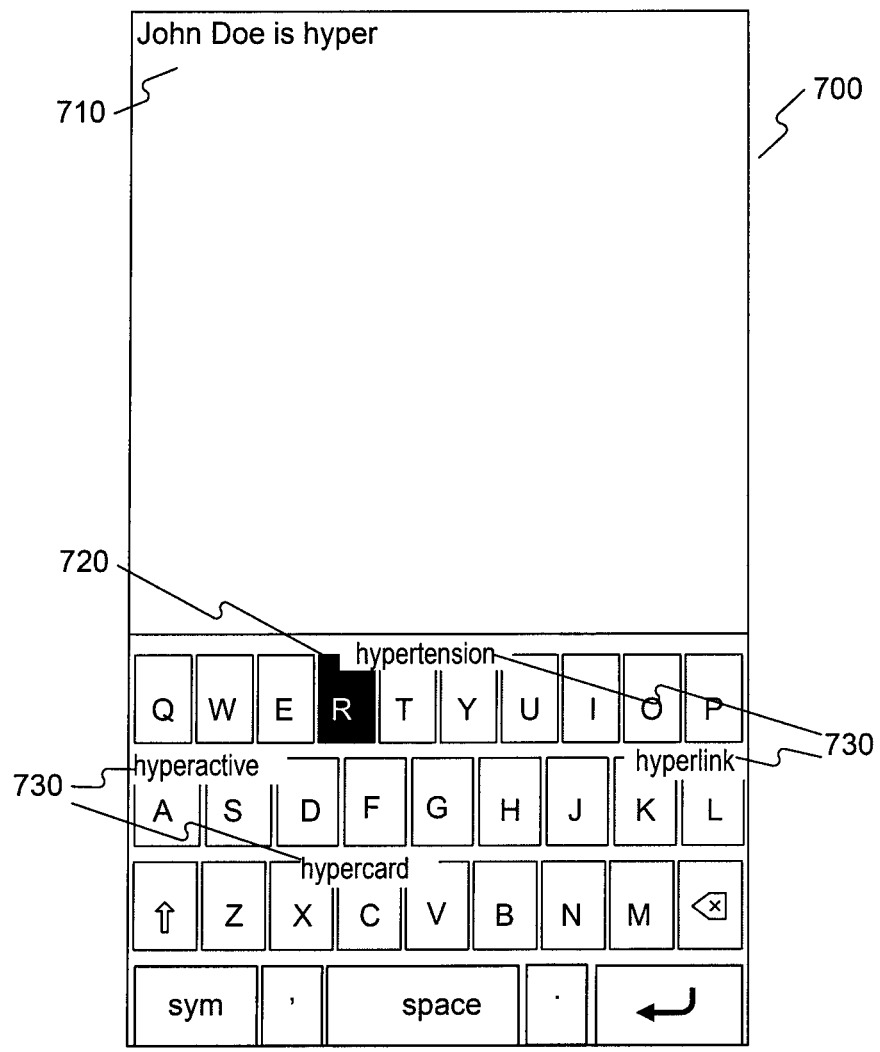
FIG. 7 shows an example front view of a touch-sensitive display in accordance with an example embodiment.

FIG. 7 shows an example front view of a touch-sensitive display that has gone through the process of predicting and displaying sets of characters. As depicted in FIG. 7, an electronic device 700, which may be, for example, device 100, has received a character input and displays "John Doe is hyper" in the input field 710, with "R" being the most recently selected key 720. As depicted in FIG. 7, a plurality of sets of characters 730 are displayed on or near keys of the device 700. For example, the word "hypertension" is displayed near the "T" key since "hyper" already appears in the text entry field and thus "t" is the subsequent candidate input character for "hypertension." Similarly, "hyperlink" is displayed near the "L" key, "hyperactive" is displayed near the "A" key, and "hypercard" is displayed near the "C" key.

Figure 3:
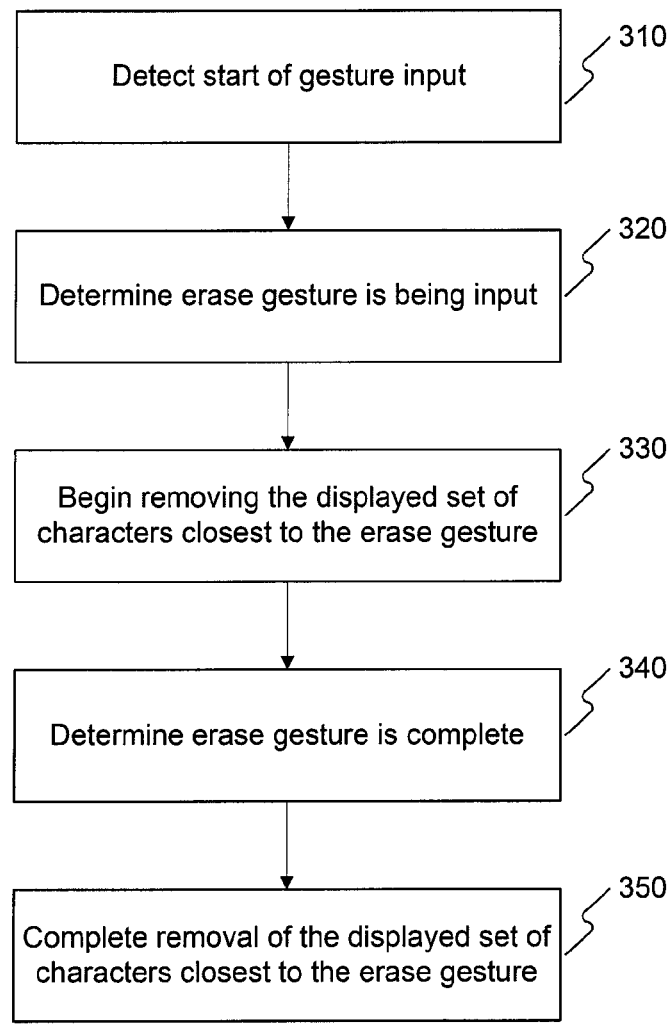
FIG. 3 is a flowchart illustrating an example method for removing displayed sets of characters.

Reference is now made to FIG. 3, which depicts a flow diagram of an example method 300 for removing displayed sets of characters. Method 300 begins with processor 102 detecting the start of a gesture input (step 310). The start of a gesture input may be detected, for example, when an object, such as a finger, touches a touch-sensitive display.

A gesture input may initially be ambiguous. For example, when an object initially touches a touch-sensitive display, a plurality of possible gestures may potentially be entered, such as a single key selection represented by, for example, a tap; a selection of a displayed set of characters represented by, for example, a swipe right; a cancellation of a previous input represented by, for example, a swipe left; and an erase gesture represented by, for example, a swipe back-and-forth (e.g., performing a swipe in one direction followed by a swipe in a substantially opposite direction one or more times). However, different movements may also be mapped to the example gestures or other gestures.

Figure 8:
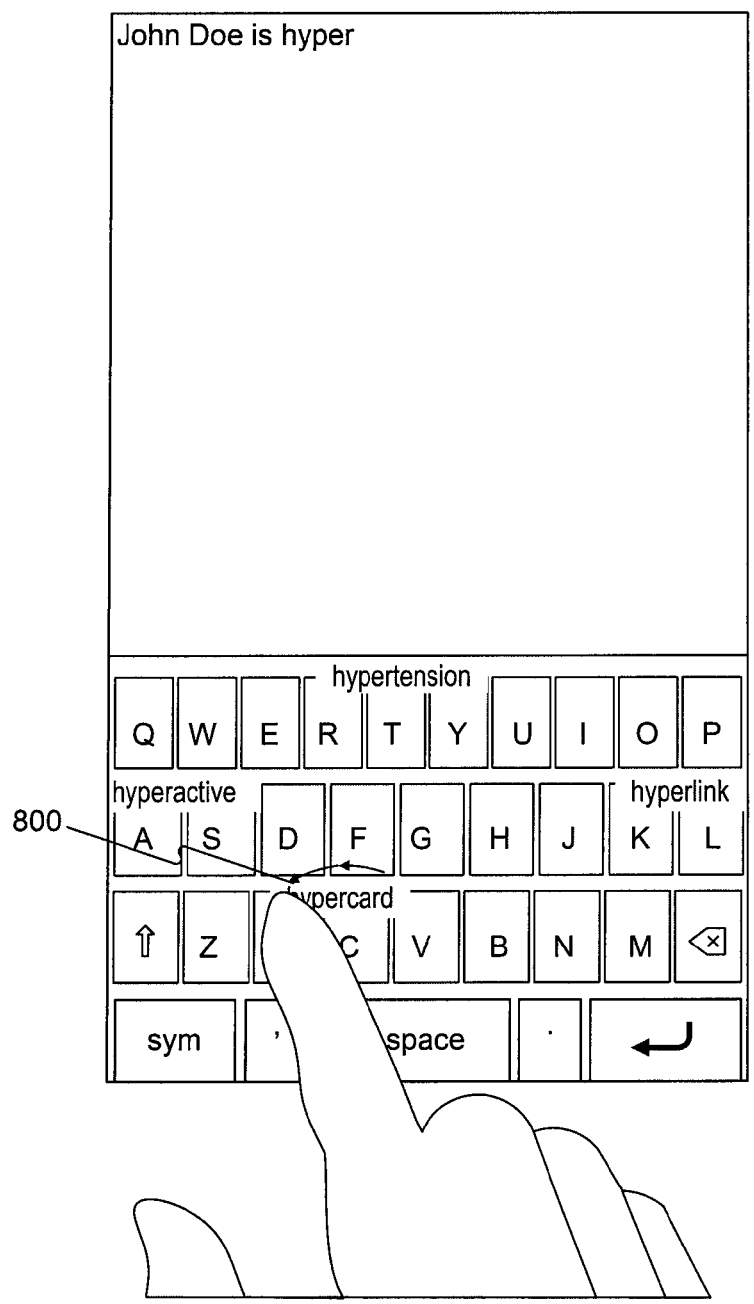
FIG. 8 shows an example front view of a touch-sensitive display in accordance with an example embodiment.

FIG. 8 shows an example front view of a touch-sensitive display receiving a gesture input 800. As depicted in FIG. 8, an object is moving in the left direction on the touch-sensitive display near the set of characters "hypercard." However, in the example shown in FIG. 8, the gesture is ambiguous, since it may be representative of a swipe-left gesture or a back-and-forth swipe gesture.

Eventually, enough of the gesture input is received for an erase gesture to be unambiguously determined (step 320). For example, in some embodiments, an erase gesture may be determined if a predetermined number of changes in direction are detected over a predetermined time. Alternatively, or additionally, in some embodiments, an erase gesture may be determined if a predetermined number of changes in direction are detected over a predetermined distance. For example, if an object moves 50 pixels on the touch-sensitive display with one change in direction, an erase gesture may be detected. In contrast, for example, if an object moves 50 pixels on the touch-sensitive display without a change in direction, a different gesture may be detected, such as, for example, a cancellation gesture or a select gesture. In some embodiments, a change in direction may be detected when the direction of an object touching the touch-sensitive display changes more than a predetermined angle over a predetermined distance or time. If a movement other than a back-and-forth movement is used to represent the erase gesture, a different procedure may be used to detect the erase gesture.

After determining that an erase gesture is being input, the displayed set of characters closest to the erase gesture may begin to be removed from the display (step 330). For example, in some embodiments portions of the displayed set of characters touched by the erase gesture may be erased. Alternatively, or additionally, in some embodiments the displayed set of characters closest to the erase gesture may begin to fade out by, for example, decreasing in intensity, brightness, or opaqueness.

Figure 9:
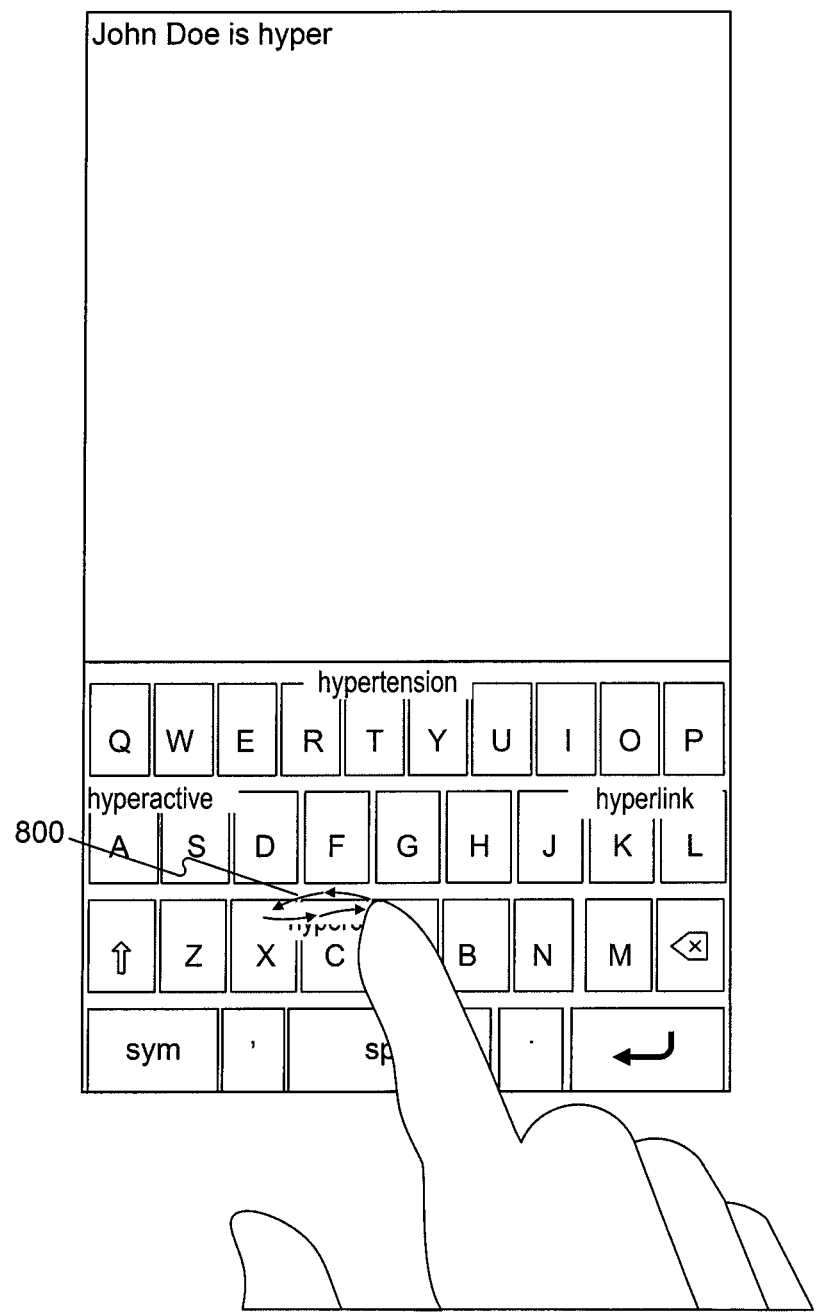
FIG. 9 shows an example front view of a touch-sensitive display in accordance with an example embodiment.

FIG. 9 shows an example front view of a touch-sensitive display receiving a gesture input 800. As depicted in FIG. 9, an object has moved in the left direction and is now moving in the right direction on the touch-sensitive display near the set of characters "hypercard." Because of the detected change in direction, the example system has determined that an erase gesture is being input. Because the set of characters "hypercard" is nearest to the erase gesture, "hypercard", as seen in FIG. 9, has begun to be removed from the display.

According to method 300, processor 102 determines that the erase gesture is complete (step 340). This determination may be made, for example, when the object making the erase gesture has moved more than a predetermined number of pixels on the touch-sensitive display or has touched the touch-sensitive display for more than a predetermined amount of time. The determination may also be made, for example, when the object making the erase gesture has made a sufficient number of changes in direction on the touch-sensitive display.

After determining that the erase gesture is complete, processor 102 completes the removal of the displayed set of characters closest to the erase gesture (step 350). In some embodiments, after determining that the erase gesture is complete, prior to complete removal of the displayed set of characters closest to the erase gesture, the processor may output a prompt to confirm that the displayed set of characters should be removed. In such embodiments, a positive response to the prompt leads to the complete removal of the displayed set of characters. In some embodiments, the displayed set of characters closest to the erase gesture may still, at least in part, be displayed when the erase gesture is complete. In such embodiments, even if the object making the erase gesture is no longer touching the touch-sensitive display the processor 102 completes the removal of the displayed set of characters.

Figure 10:
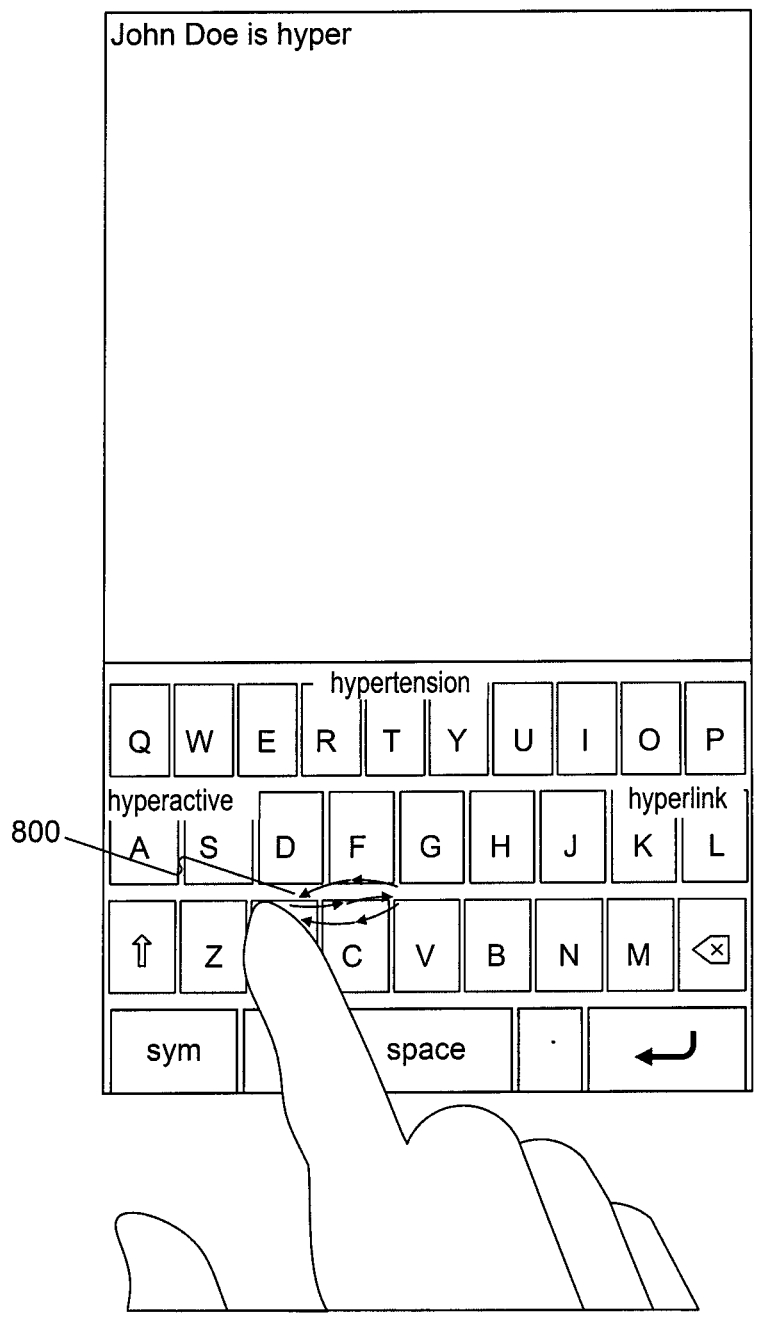
FIG. 10 shows an example front view of a touch-sensitive display in accordance with an example embodiment.

FIG. 10 shows an example front view of a touch-sensitive display receiving a gesture input 800. As depicted in FIG. 10, an object has moved in the left direction, then the right direction, and is now moving back in the left direction on the touch-sensitive display. Because of two detected changes in direction, the example system has determined that the erase gesture is complete. Because the set of characters "hypercard" was nearest to the erase gesture (as depicted in FIGS. 8 and 9), "hypercard" has been completely removed from the display.

In some embodiments, removal of a displayed set of characters may affect sets of characters generated in the future, ranking of generated sets of characters in the future, and/or subsequent selections of sets of characters for display. For example, the context data used to select sets of characters may store data regarding previously erased sets of characters, such that previously erased sets of characters would not be proposed as selected sets of characters for display. In some embodiments, an erased set of characters may again be proposed as a selected set of characters for display if the set of characters is explicitly entered by tapping of individual keys.

Figure 4:
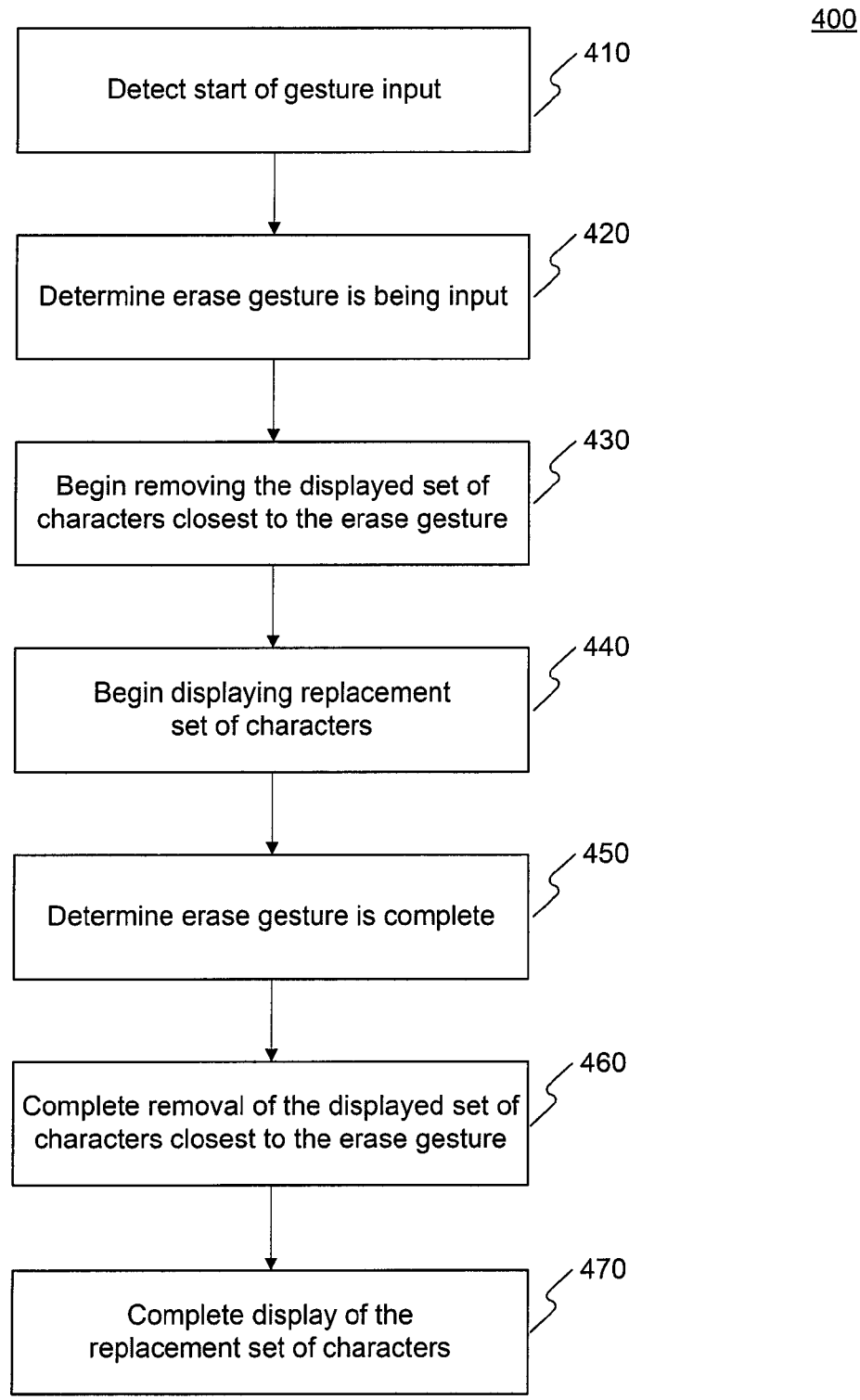
FIG. 4 is a flowchart illustrating an example method for replacing displayed sets of characters.

Reference is now made to FIG. 4, which depicts a flow diagram of an example method 400 for replacing displayed sets of characters. According to method 400, processor 102 detects the start of a gesture input (step 410), performed in substantially the same manner as step 310 of method 300. In addition, processor 102 then determines that an erase gesture is being input (step 420) and begins removing the displayed set of characters closest to the erase gesture (step 430), performed in substantially the same manner as steps 320 and 330, respectively, of method 300.

Processor 102 then begins to display a replacement set of characters at or near the location of the set of characters being removed (step 440). In some embodiments, the replacement set of characters may be chosen based on a previously determined ranking (e.g., the ranking of step 230 in method 200). For example, if, as depicted in FIGS. 8-10, the set of characters "hypercard" is being removed, a replacement set of characters "hyperglycemic", representative of the highest ranked set of characters not having been displayed, may be displayed. In addition, in some embodiments, the replacement set of characters may have a subsequent candidate input character that is the same as the subsequent candidate input character of the set of characters being removed. For example, if, as depicted in FIGS. 8-10, the set of characters "hypercard" is being removed, a replacement set of characters "hypercube", representative of a set of characters having the same subsequent candidate input character as "hypercard", may be displayed. In some embodiments, the subsequent candidate input character of the replacement set of characters will correspond to a key that is the same as or adjacent to a key that corresponds to the subsequent candidate input character of the set of characters being removed. In some embodiments, as more of the erase gesture is received, more of the replacement set of characters may be displayed. For example, in some embodiments, the replacement set of characters may fade in as more of the erase gesture is received, by, for example, increasing intensity, brightness, or opaqueness of the replacement set of characters.

According to the method 400, processor 102 determines that the erase gesture is complete (step 450) and completes the removal of the displayed set of characters closest to the erase gesture (step 460) in substantially the same manner as steps 340 and 350, respectively, of method 300. In addition, processor 102 completes the display of the replacement set of characters (step 470). After the display of the replacement set of characters has been completed, the replacement set of characters may be input in the same manner as the other sets of characters displayed on or near the keyboard (e.g., using a swipe-right gesture).

Figure 5:
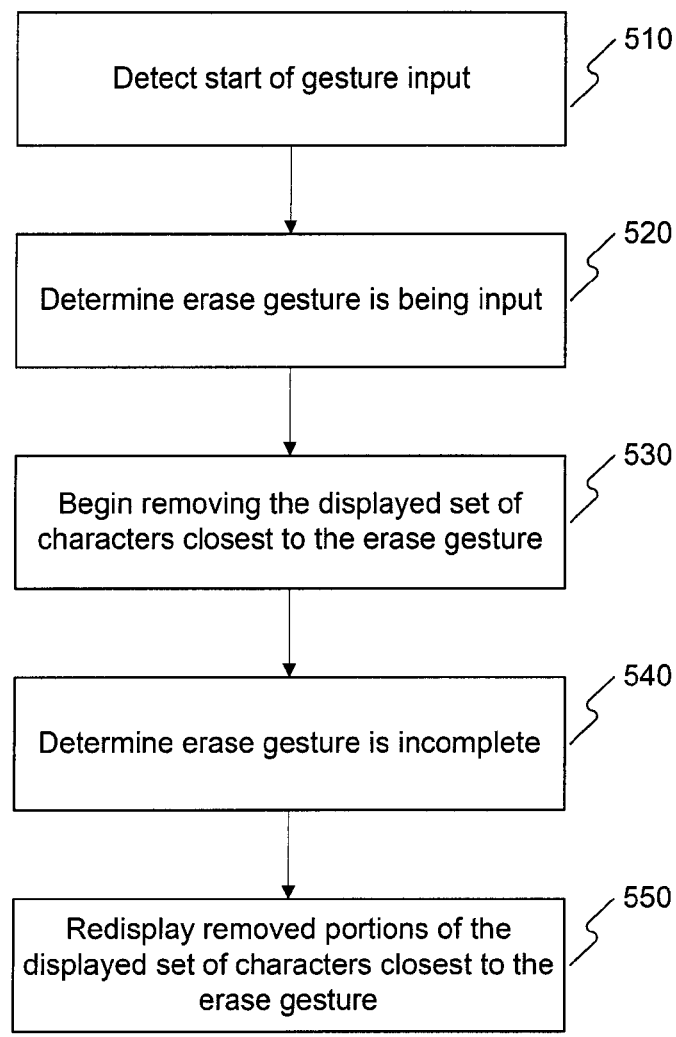
FIG. 5 is a flowchart illustrating an example method for replacing displayed sets of characters.

Reference is now made to FIG. 5, which depicts a flow diagram of example method 500 for replacing displayed sets of characters. According to method 500, processor 102 detects the start of a gesture input (step 510), performed in substantially the same manner as step 310 of method 300. In addition, processor 102 then determines that an erase gesture is being input (step 520) and begins removing the displayed set of characters closest to the erase gesture (step 530), performed in substantially the same manner as steps 320 and 330, respectively, of method 300.

Processor 102 then determines that the erase gesture is incomplete (step 540). A determination that the erase gesture is incomplete may be made, for example, if the object making the erase gesture stops touching the touch-sensitive display before it is determined that the erase gesture is complete (e.g., the object making the erase gesture stops touching the touch-sensitive display before a determination as described in step 340 of method 300). If the processor 102 determines that the erase gesture is incomplete, the displayed set of characters closest to the erase gesture may be redisplayed as it was originally presented (e.g., removal of the displayed set of characters closest to the erase gesture performed in step 530 may be undone) (step 550).

Figure 6:
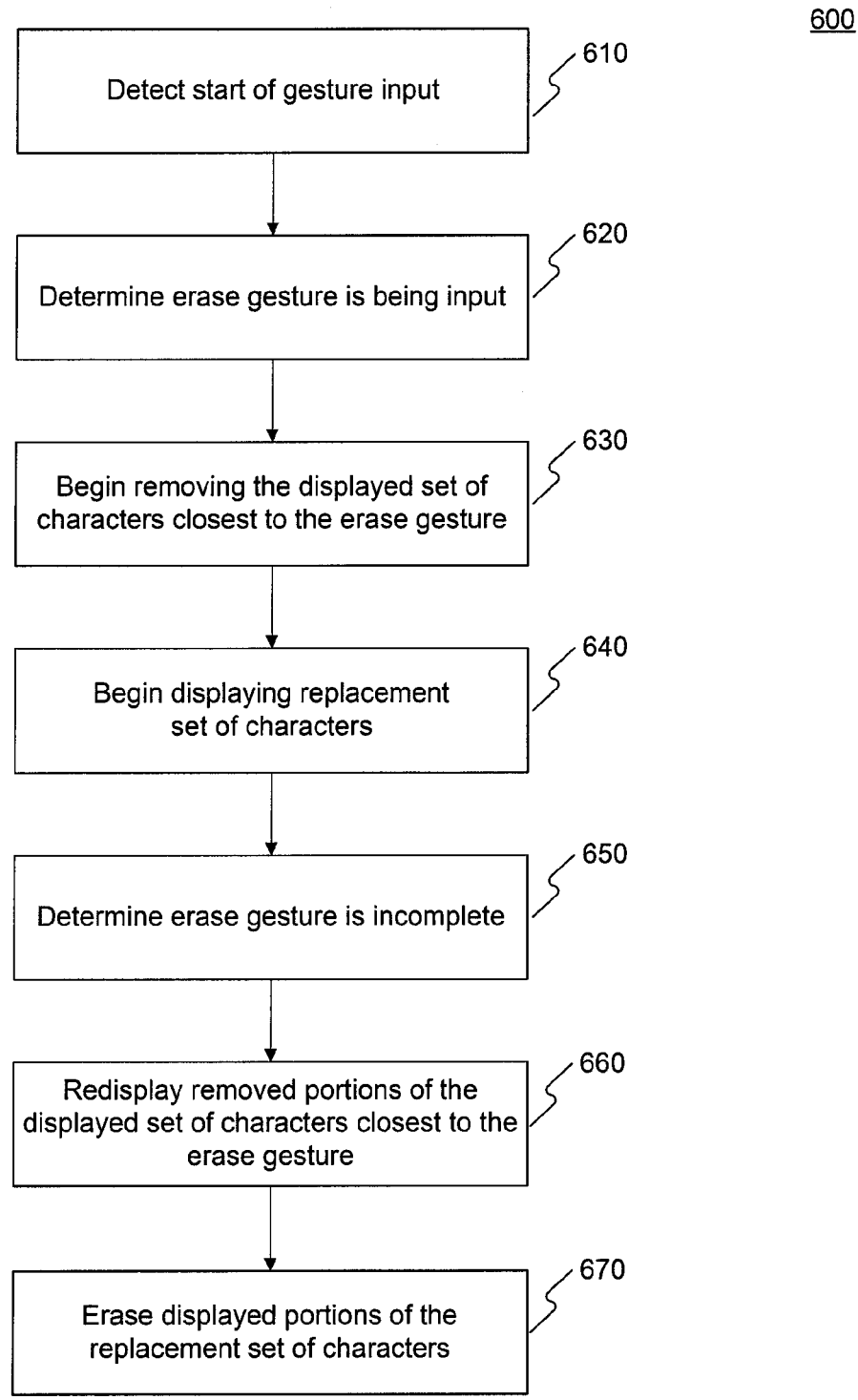
FIG. 6 is a flowchart illustrating an example method for replacing displayed sets of characters.

Reference is now made to FIG. 6, which depicts a flow diagram of example method 600 for replacing displayed sets of characters. According to method 600, processor 102 detects the start of a gesture input (step 610), performed in substantially the same manner as step 410 of method 400. In addition, processor 102 then determines that an erase gesture is being input (step 620), begins removing the displayed set of characters closest to the erase gesture (step 630), and begins displaying a replacement set of characters (step 640), performed in substantially the same manner as steps 420, 430, and 440, respectively, of method 400.

Processor 102 then determines that the erase gesture is incomplete (step 650). A determination that the erase gesture is incomplete may be made, for example, if the object making the erase gesture stops touching the touch-sensitive display before it is determined that the erase gesture is complete (e.g., the object making the erase gesture stops touching the touch-sensitive display before a determination as described in step 450 of method 400). If the processor 102 determines that the erase gesture is incomplete, the displayed set of characters closest to the erase gesture may be redisplayed as it was originally presented (e.g., removal of the displayed set of characters closest to the erase gesture performed in step 630 may be undone) (step 660). In addition, if the processor 102 determines that the erase gesture is incomplete, portions of the replacement set of characters that have been displayed may be erased (e.g., display of the replacement set of characters performed in step 640 may be undone) (step 670).

Displaying sets of characters as prediction candidates within or substantially within a virtual keyboard enables content to be entered into a device with greater speed and accuracy. However, a user may find some displayed sets of characters distracting and/or unlikely to assist in content entry if, for example, the user believes some of the sets of characters are not intended for entry. Enabling the removal or replacement of on-keyboard prediction candidates may provide a number of advantages, such as, for example, more accurate and less distracting use of on-keyboard prediction candidates.

While the above description provides examples of one or more processes or apparatuses, it will be appreciated that other processes or apparatuses can be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. An input method for an electronic device having a touch-sensitive display and a processor, the method comprising:
   displaying in a display area of the touch-sensitive display a virtual keyboard;
   displaying within the virtual keyboard a plurality of keys, each of at least some of the keys corresponding to one or more different characters of a plurality of characters;
   detecting a selection of one or more of the keys;
   generating a plurality of words based on the one or more characters corresponding to the selected keys;
   displaying the plurality of words within or substantially within the virtual keyboard, wherein the displayed plurality of words are displayed directly above or overlapping keys corresponding to subsequent candidate input characters of the plurality of words, and the displayed plurality of words are displayed without overlapping displayed characters on the keys corresponding to subsequent candidate input characters of the plurality of words;
   detecting an erase gesture associated with one of the displayed plurality of words at or near the one of the displayed plurality of words;
   in response to the erase gesture:

undisplaying the one of the displayed plurality of words from the virtual keyboard based on the determined completion, wherein at least one other displayed word of the plurality of words is maintained within or substantially within the virtual keyboard after the one of the displayed plurality of words is removed; and displaying a replacement word within the virtual keyboard; and during subsequent selections of the one or more keys, omitting display of the one of the plurality of words while displaying remaining words in the plurality of words.

2. The method of claim 1, wherein the replacement word has a subsequent candidate input character that is the same as a subsequent candidate input character of the removed word.

3. The method of claim 1, wherein the replacement word has a subsequent candidate input character that corresponds to a key that is the same as or adjacent to a key that corresponds to a subsequent candidate input character of the removed word.

4. The method of claim 1, further comprising:
withdrawing the removed word from consideration for being generated subsequent to the removal.

5. An electronic device comprising:
a touch-sensitive display;
one or more processors;
one or more memories;
instructions stored on the one or more memories, which, when executed by the one or more processors, cause the electronic device to perform the steps of:
displaying in a display area of the touch-sensitive display a virtual keyboard;
displaying within the virtual keyboard a plurality of keys, each of at least some of the keys corresponding to one or more different characters of a plurality of characters;
detecting a selection of one or more of the keys;
generating a plurality of words based on the one or more characters corresponding to the selected keys;
displaying the plurality of words within or substantially within the virtual keyboard, wherein the displayed plurality of words are displayed directly above or overlapping keys corresponding to subsequent candidate input characters of the plurality of words, and the displayed plurality of words are displayed without overlapping displayed characters on the keys corresponding to subsequent candidate input characters of the plurality of words;
detecting an erase gesture associated with one of the displayed plurality of words at or near the one of the displayed plurality of words;
in response to the erase gesture:
undisplaying the one of the displayed plurality of words from the virtual keyboard based on the determined completion, wherein at least one other displayed word of the plurality of words is maintained within or substantially within the virtual keyboard after the one of the displayed plurality of words is removed; and
displaying a replacement word within the virtual keyboard; and
during subsequent selections of the one or more keys, omitting display of the one of the plurality of words while displaying remaining words in the plurality of words.

6. The electronic device of claim 5, wherein the replacement word has a subsequent candidate input character that is the same as a subsequent candidate input character of the removed word.

7. The electronic device of claim 5, wherein the replacement word has a subsequent candidate input character that corresponds to a key that is the same as or adjacent to a key that corresponds to a subsequent candidate input character of the removed word.

8. The electronic device of claim 5, wherein the displayed plurality of words are displayed at or near a keys corresponding to subsequent candidate input characters of the plurality of words.

9. The electronic device of claim 5, wherein the instructions stored on the one or more memories, when executed by the one or more processors, further cause the electronic device to perform the step of:
withdrawing the removed plurality of words from consideration for being generated subsequent to the removal.

10. An electronic device, comprising:
a touch-sensitive display; and
a processor configured to:
display in a display area of the touch-sensitive screen a virtual keyboard;
display within the virtual keyboard a plurality of keys;
display within the display area a viewing pane configured to hold a predetermined amount of text;
detect selection of one or more of the keys forming a prefix text portion, the prefix text portion comprising one or more characters;
display the prefix text portion in the viewing pane;
determine a plurality of words as a function of the prefix text portion;
display the plurality of words proximate to selected keys of the virtual keyboard, each selected key being selected based on a first character in each of the displayed plurality of words, wherein the displayed plurality of words are displayed directly above or overlapping keys corresponding to subsequent candidate input characters of the plurality of words, and the displayed plurality of words are displayed without overlapping displayed characters on the keys corresponding to subsequent candidate input characters of the plurality of words;
detect an erase gesture associated with one of the plurality of words at or near the one of the displayed plurality of words; and
in response to the erase gesture:
undisplay the one of the plurality of words associated with the gesture from the virtual keyboard based on the determined completion, wherein at least one other displayed word of the plurality of word of the plurality of plurality of words is maintained within or substantially within the virtual keyboard after the one of the displayed one of the potential completion text portions is removed; and
display a replacement word within the virtual keyboard; and
during subsequent selections of the one or more keys, omit display of the one of the plurality of words while displaying remaining words in the plurality of words.

11. The electronic device of claim 10, further comprising a linguistic database, and wherein the processor is further configured to:

determine one or more plurality of words as a function of the prefix text portion, the one or more plurality of words having the prefix text portion as a prefix and being selected from the linguistic database.

12. The method of claim 1, wherein the erase gesture is a back-and-forth swipe gesture.

* * * * *